United States Patent
Eccles et al.

(10) Patent No.: US 9,308,993 B2
(45) Date of Patent: Apr. 12, 2016

(54) AIRCRAFT PAYLOAD APPARATUS AND METHOD

(71) Applicant: BAE Systems Plc, London (GB)

(72) Inventors: Mark Eccles, Preston (GB); Ian Peter Macdiarmid, Preston (GB); Christopher Charles Rawlinson Jones, Preston (GB)

(73) Assignee: BAE SYSTEMS PLC, London (GB)

(*) Notice: Subject to any disclaimer, the term of this patent is extended or adjusted under 35 U.S.C. 154(b) by 0 days.

(21) Appl. No.: 14/406,839

(22) PCT Filed: Jun. 6, 2013

(86) PCT No.: PCT/GB2013/051495
§ 371 (c)(1),
(2) Date: Dec. 10, 2014

(87) PCT Pub. No.: WO2013/186536
PCT Pub. Date: Dec. 19, 2013

(65) Prior Publication Data
US 2015/0217867 A1    Aug. 6, 2015

(30) Foreign Application Priority Data

Jun. 11, 2012 (GB) .................................. 1210205.9

(51) Int. Cl.
*B64D 1/12* (2006.01)
*B64D 7/00* (2006.01)
(Continued)

(52) U.S. Cl.
CPC .. *B64D 1/12* (2013.01); *B64D 7/00* (2013.01); *B64D 37/12* (2013.01); *B64D 41/007* (2013.01);
(Continued)

(58) Field of Classification Search
CPC ........ B64D 1/12; B64D 37/12; B64D 41/007; B64D 45/00; B64D 47/08; B64D 7/00; F41G 3/145; F41G 3/22; G03B 15/006

USPC ............................................................ 244/58
See application file for complete search history.

(56) References Cited

U.S. PATENT DOCUMENTS 2,012,160 A    8/1935    Forbes
2,877,688 A *    3/1959    Markil .................... B64D 1/04
                                                            294/82.26
(Continued)

FOREIGN PATENT DOCUMENTS

WO      03097453 A2    11/2003
WO    2010123422 A1    10/2010

OTHER PUBLICATIONS

PCT Search Report dated Sep. 9, 2013 of Patent Application No. PCT/GB2013/051495 filed Jun. 6, 2013, 5 pages.
(Continued)

*Primary Examiner* — Justin Benedik
(74) *Attorney, Agent, or Firm* — Maine Cernota & Rardin

(57) ABSTRACT

A method of providing apparatus comprising: providing a first store and a first payload on or in the first store, the first store being for mounting to the outside of an aircraft; acquiring aerodynamic properties, moments of inertia, and the mass distribution of the first store and first payload; providing a second store and a second payload, the second payload being on or in the second store, the second store being for mounting to the outside of the aircraft, the second payload being different to the first, the second payload comprising a sensor and/or a projecting means; and configuring the second store and the second payload such that the aerodynamic properties, moments of inertia, and mass distribution of the second store and the second payload are substantially the same as those of the first store and first payload.

15 Claims, 1 Drawing Sheet

(51) Int. Cl.
*B64D 37/12* (2006.01)
*B64D 47/08* (2006.01)
*F41G 3/14* (2006.01)
*F41G 3/22* (2006.01)
*G03B 15/00* (2006.01)
*B64D 41/00* (2006.01)
*B64D 45/00* (2006.01)

(52) U.S. Cl.
CPC ............... *B64D 45/00* (2013.01); *B64D 47/08* (2013.01); *F41G 3/145* (2013.01); *F41G 3/22* (2013.01); *G03B 15/006* (2013.01)

(56) References Cited

U.S. PATENT DOCUMENTS

| | | | | |
|---|---|---|---|---|
| 4,395,003 A * | 7/1983 | Coutin | ...................... | B64D 7/08 244/137.4 |
| 4,606,517 A * | 8/1986 | Adams | ...................... | B64D 1/06 244/137.4 |
| 4,736,669 A * | 4/1988 | Long | ...................... | F41F 3/06 89/1.53 |
| 4,829,876 A * | 5/1989 | Witt | ...................... | F41F 3/06 89/1.53 |
| 6,152,041 A * | 11/2000 | Harris | ...................... | F42B 10/18 102/384 |
| 6,688,209 B1 * | 2/2004 | McMahon | ............... | B64D 1/04 244/137.4 |
| 7,624,947 B2 * | 12/2009 | Dortch | ...................... | B64D 7/04 244/118.1 |
| 7,966,921 B1 * | 6/2011 | Alday | ...................... | B64D 1/02 244/137.4 |
| 8,495,945 B1 * | 7/2013 | Kirchner | ................. | F41F 3/055 89/1.8 |
| 8,608,111 B2 * | 12/2013 | McMahon | ............... | B64D 1/06 244/137.4 |
| 2005/0204910 A1 * | 9/2005 | Padan | ...................... | B64D 1/04 89/1.813 |
| 2007/0205327 A1 * | 9/2007 | Gioffre | ................... | B64D 47/08 244/118.1 |

OTHER PUBLICATIONS

GB Search Report dated Sep. 28, 2012 of GB Application No. 1210205.9 filed Jun. 11, 2012, 3 pages.

* cited by examiner

AIRCRAFT PAYLOAD APPARATUS AND METHOD

RELATED APPLICATIONS

This application is a National Phase Application filed under 35 USC §371 of PCT Application No. PCT/GB2013/051495, filed Jun. 6, 2013 which claims priority to GB 1210205.9, filed Jun. 11, 2012. Each of these applications is herein incorporated by reference in their entirety for all purposes.

FIELD OF THE INVENTION

The present invention relates to apparatus for mounting to an external surface of an aircraft.

BACKGROUND

The use of external stores on aircraft is known.

For example, external fuel tanks, also known as drop tanks, are an expendable fuel tank carried by aircraft for long-range flights. The drop tank may be jettisoned from the aircraft, for example, in an emergency or after the fuel within it has been expended.

Typically, external stores impose a drag penalty on the aircraft carrying them.

Furthermore, when carrying such external stores, the aerodynamic properties of the aircraft tend to be changed. The moment of inertia of the aircraft may also be increased, thereby reducing roll rates of the aircraft. Also, the distribution of mass for the aircraft carrying such external stores tends to be different to the distribution of mass for the aircraft alone.

Typically, in order for a particular type of aircraft to be permitted to carry a particular type of external store, the external store must be certified for the particular type of aircraft by some authority.

In a separate field to aircraft external stores, sensing equipment used by aircraft is typically mounted on the aircraft forebody. However, achieving optimal locations of multiple sensors tends to be difficult due to the lack of space in the aircraft nose.

SUMMARY OF THE INVENTION

In a first aspect the present invention provides a method of providing apparatus for use on an aircraft, the method comprising: providing a first store and a first payload, the first payload being mounted on or at least partially housed within the first store, the first store being for mounting to an external surface of the aircraft such that the combination of the first store and first payload is wholly outside the aircraft, acquiring (e.g. by measuring) one or more aerodynamic properties, one or more moments of inertia, and the mass distribution of the combination of the first store and first payload, providing a second store and a second payload, the second payload being mounted on or at least partially housed within the second store, the second store being for mounting to an external surface of the aircraft such that the combination of the second store and second payload is wholly outside the aircraft, the second payload being different to the first payload, the second payload comprising a sensor and/or a projecting means, the sensor being for measuring parameters of an entity or system that is remote from the aircraft, the projecting means being for projecting a mark onto a surface, and configuring the second store and the second payload such that the one or more aerodynamic properties, one or more moments of inertia, and the mass distribution of the combination of the second store and the second payload are substantially the same as those of the combination of the first store and first payload, thereby providing the apparatus.

The one or more aerodynamic properties, one or more moments of inertia, and the mass distribution of the combination of the first store and first payload may be for when the combination of the first store and first payload is mounted on the aircraft such that the combination of the first store and first payload is wholly outside the aircraft.

The second store may be different to the first store.

The steps of providing the second store and the second payload and configuring the second store and the second payload may only be performed if the measurements of the one or more aerodynamic properties, one or more moments of inertia, and the mass distribution of the combination of the first store and first payload satisfy one or more predefined criteria (e.g. those required to certify that the first store and first payload may be used on, e.g. mounted to, the aircraft).

The second payload may further comprise a power source (e.g. a Ram Air Turbine) for at least partially powering the sensor and/or a projecting means.

The second payload may further comprise a processor for processing a signal generated by the sensor and/or a projecting means.

The second payload may further comprise a transmitter for transmitting, from the apparatus, across a wireless communications link, a signal (e.g. a signal generated by the sensor and/or a projecting means). The signal may be for use by an entity remote from the apparatus.

The sensor may be one of the following type of sensors: a visual camera, a hyper-spectral camera, an infrared camera, an ultra-violet camera, a LIDAR sensor, or a Ground Penetrating Radar sensor.

The projecting means may be a laser marker for projecting a laser mark onto a surface.

A store may be for mounting to an external surface of an aircraft via an interface (e.g. a NATO standard interface). The interface may comprise a pylon. The pylon may such that the mounted store is clear of control surfaces of the aircraft.

A store may be for mounting to an external surface of an aircraft such that the store may be jettisoned from the aircraft during flight.

The second payload may further comprise ballast. A mass of the ballast and a position of the ballast with respect to the second store (or a distribution of the ballast within the second store) may be selected such that the one or more moments of inertia, and the mass distribution, of the combination of the second store and the second payload are substantially the same as those of the combination of the first store and first payload.

The method may further comprise mounting, to an external surface of the aircraft, the combination of the second store and second payload such that the combination of the second store and second payload is wholly outside the aircraft.

In a further aspect, the present invention provides apparatus provided by performing the method of the above first aspect.

In a further aspect, the present invention provides an aircraft mounted with apparatus according to the above aspect.

DETAILED DESCRIPTION

Figure 1:
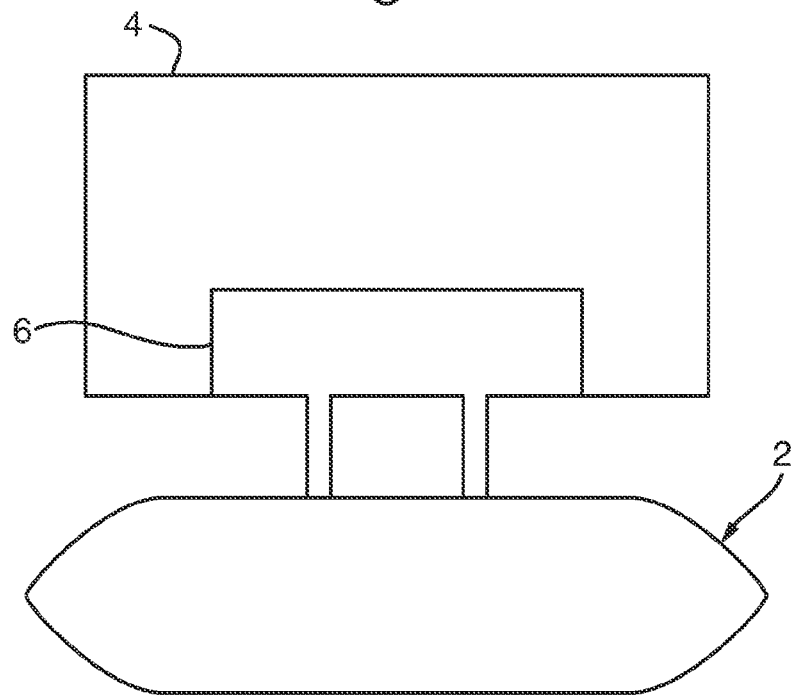
FIG. 1 is a schematic illustration (not to scale) of an embodiment of a sensor system which is coupled to an aircraft.

FIG. 1 is a schematic illustration (not to scale) of an embodiment of a sensor system 2 which is coupled to an aircraft 4.

The sensor system is 2 is described in more detail later below with reference to FIG. 2.

In this embodiment, the aircraft 4 is an aeroplane.

In this embodiment the sensor system 2 is coupled to an underside of the fuselage of the aircraft 4. However, in other embodiments, the sensor system 2 is coupled to a different portion of the aircraft 4, for example, an underside of a wing of the aircraft 4.

In this embodiment, the sensor system 2 is coupled to the aircraft 4 via an interface 6.

In this embodiment, the interface 6 is a conventional North Atlantic Treaty Organisation (NATO) standard interface. The sensor system 2 attaches/hangs from the compatible airframe.

In this embodiment, the interface 6 comprises a pylon. The pylon is mounted in a hardpoint of the fuselage of the aircraft 4. The pylon positions the sensor system 2 such that it is clear of control surfaces of the aircraft 4.

Also, in this embodiment the sensor system 2 is mounted to the aircraft 4 via the interface 6 such that, if desired, the sensor system 2 may be jettisoned or released from the aircraft during flight.

Thus, in this embodiment the sensor system 2 is external to the airframe of the aircraft 4.

Figure 2:
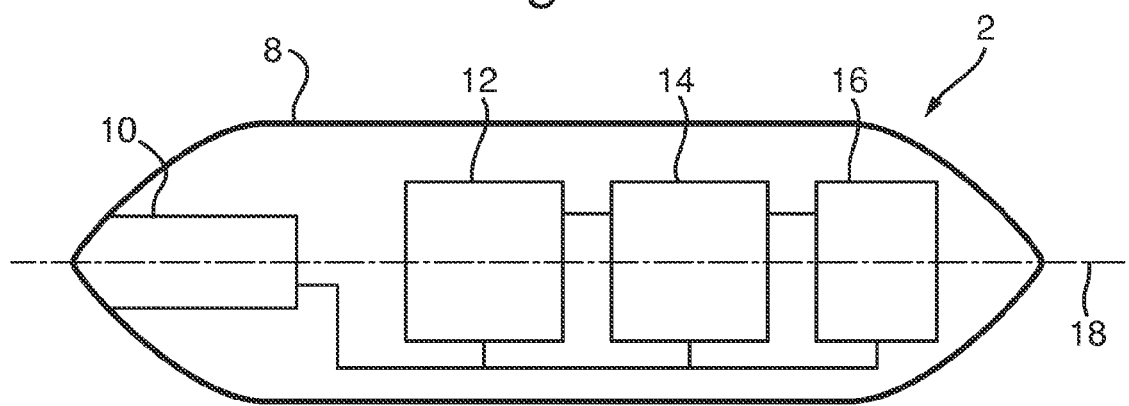
FIG. 2 is a schematic illustration (not to scale) of the sensor system.

FIG. 2 is a schematic illustration (not to scale) of the sensor system 2.

In this embodiment, the sensor system 2 comprises a store 8, a ram air turbine (RAT) 10, one or more sensors or sensing system, which will hereinafter be referred to as the "sensors 12", a processor 14, and a transceiver 16.

In this embodiment, the store 8 houses the RAT 10, the sensors 12, the processor 14, and the transceiver 16. In other words, the RAT 10, the sensors 12, the processor 14, and the transceiver 16 are located at least partially within the store 8.

In this embodiment, the shape of the store 8 is substantially that of a cylinder or tube having respective cone shaped portion at each end of the cylinder. In this embodiment, the shape of the store 8 is that of a conventional external store for mounting to an aircraft, for example, a store used to house fuel or weaponry.

In FIG. 2, a longitudinal axis of the store 8, hereinafter referred to as the "store axis", is indicated by a dotted line and the reference numeral 18.

In this embodiment, the sensor system 2 is mounted to the aircraft 4 such that the store axis 18 is substantially parallel to a longitudinal axis of the aircraft 4.

In this embodiment, the RAT 10 is positioned within the store 8 such that it is at or proximate to a front of the store 8 as the aircraft 4 flies.

In this embodiment, the RAT 10 is coupled to each of the sensors 12, the processor 14 and the transceiver 16.

In this embodiment, the RAT 10 is a conventional RAT, i.e. a small turbine that is connected to a generator. The RAT 10 generates power from the airstream as the aircraft 4 flies. Power generated by the RAT 10 is used to power the sensors 12, the processor 14 and the transceiver 16.

In this embodiment, the sensors 12 comprise any number of any of the following sensors: a visual camera, a hyperspectral camera, an infrared camera, an ultra-violet camera, a laser/Light distance and Ranging (LIDAR) system, and/or a Ground Penetrating Radar (GPR) system. In particular, the sensors 12 may comprise any sensors for measuring systems remote from the aircraft 4 or sensor system 2. However, in other embodiments, the sensors 12 comprise any number of different types of sensor instead of or in addition to those listed. Also, in other embodiments, the sensors 12 may comprise any number of different systems, for example a laser marker for projecting a laser mark onto the ground, instead of or in addition to those sensors listed.

In this embodiment, in flight, the sensors 12 are wholly powered using power generated by the RAT 10.

In operation, the sensors 12 take measurements, e.g. of an area of terrain or airspeed/air pressure. The sensors 12 are connected to the processor 14 such that, in operation, a signal corresponding to the measurements taken by the sensors 12 is transmitted from the sensors 12 to the processor 14.

In this embodiment, the processor 14 is a conventional High Power Near Real Time Processor. In flight, the processor 14 is wholly powered using power generated by the RAT 10.

In operation, the processor 14 receives from the sensors 12 a signal corresponding to the measurements taken by the sensors 12. This signal is processed by the processor 14.

In this embodiment, the processor 14 connected to the transceiver 16. The processor 14 is connected to the transceiver 16 such that, in operation, the processed signal produced by the processor 14 is transmitted from the processor 14 to the transceiver 16.

In this embodiment, the transceiver 16 is a conventional Radio Frequency (RF) transceiver. In flight, the transceiver 16 is wholly powered using power generated by the RAT 10.

In operation, the transceiver 16 receives from the processor 14 a processed signal.

In this embodiment, there is a wireless, two-way communications link between the transceiver 16 and an operator of the aircraft 4 (the operator is not shown in the Figures). The operator of the aircraft 4 may be, for example, a pilot of the aircraft 4. In this embodiment, the operator is remote from the sensor system 2. In other embodiments, the transceiver 16 is linked to a different system or entity, for example, a different aircraft system on board the aircraft 4.

In operation, the transceiver 16 transmits the processed signal for use by the operator.

In this embodiment, the wireless link between the transceiver 16 and the operator is a coded link. This advantageously tends to provide that the wireless link is suitably robust.

In this embodiment, the sensor system 2 is configured such that it has substantially the same aerodynamic properties, mass distribution (i.e. the spatial distribution of mass within the entity), and moments of inertia (in all three axes) as one of the stores already certified for carriage on the aircraft 4 (e.g. a fuel or weapons store). Thus, it tends to be possible to mount the sensor system 2 on the aircraft 4 in place of a different stores already certified for the aircraft 4 without the need for separate certification for the sensor system 2. Also, emergency ejection release of the sensor system 2 from the aircraft 4 would similarly be cleared.

The aerodynamic properties, mass distribution, and moments of inertia of the sensor system 2 may be determined through testing and/or modelling (e.g. wind-tunnel testing to analysis aerodynamic properties).

In this embodiment, the aerodynamic properties of the sensor system 2 tend to be primarily governed by the shape and external structure detail of the store 8.

In this embodiment, the aerodynamic properties of the sensor system 2 are substantially the same as those of a certified aircraft store. This may be achieved, for example, by providing that the store 8 is substantially the same shape as a certified aircraft store. If necessary, external structures (e.g. fins and the like) may be added or removed from the external surface of the store 8 to ensure the aerodynamic properties of the sensor system 2 are substantially the same as those of a certified aircraft store.

In this embodiment, the mass distribution and moments of inertia (in all three axes) of the sensor system 2 consider mass distribution of the store 8 and the masses and positions of the components of the sensor system 2 within the store 8 (i.e. the RAT 10, the sensors 12, the processor 14, and the transceiver 16).

In this embodiment, the mass distribution and moments of inertia of the sensor system 2 are substantially the same as those of a certified aircraft store. This may be achieved by positioning the RAT 10, the sensors 12, the processor 14, and the transceiver 16 within in the store 8 so as to achieve an overall mass distribution and moments of inertia for the sensor system 2 that are substantially the same as those of a certified aircraft store. If necessary, parasitic mass (e.g. as provided by ballast) may be added at appropriate positions within the store 8, and/or on an external surface of the store 8, to ensure that the mass distribution and moments of inertia of the sensor system 2 are substantially the same as those of a certified aircraft store.

Thus, an embodiment of a sensor system 2 which is coupled to an aircraft 4 is provided.

An advantage provided by the use of NATO standard interfaces to attach/hang the store to the airframe is that a need for costly, complicated, or time consuming aircraft integration tends to be reduced or eliminated.

Furthermore, a need for certification of the store, e.g. to clear the store for flight, tends to be reduced or eliminated.

An advantage provided by the store being self-powered (by the RAT) is that a need for an interface to the aircraft electrical power system tends to be reduced or eliminated. Such an interface to the aircraft electrical power system would typically require clearance in terms of power system integration and electromagnetic hazard concerns.

Furthermore, aircraft power is typically at a premium, and self-powering systems minimise further loading.

Also, it tends to be possible to advantageously position the RAT on the store such that the RAT does not adversely affect any of the aerodynamic properties of the store (which have been previously cleared for flight), or such that adverse aerodynamic effects are substantially minimised.

An advantage provided by the use of a wireless, two-way communication between the store and a remote entity (as provided by the above described transceiver) is that a need for a physical communications link between the store and the entity tend to be reduced or eliminated. Such a link would typically require further, separate clearance.

In the above embodiments, the aircraft is an aeroplane, e.g. a fast jet, or propeller aircraft. However, in other embodiments, the aircraft is a different type of aircraft, for example an unmanned air vehicle (UAV), or helicopter. In other embodiments, the sensor system is mounted on a different type of vehicle, e.g. a water-based vehicle.

In the above embodiments, the sensor system is coupled to the aircraft using a conventional NATO standard interface. The interface comprises a pylon mounted at a hard point of the fuselage of the aircraft which positions the sensor system such that it is clear of control surfaces of the aircraft. Also, in the above embodiments the sensor system is mounted to the aircraft such that it may be jettisoned or released from the aircraft during flight. However, in other embodiments, the sensor system is mounted to the aircraft in a different way.

In the above embodiments, the store houses inter alia the RAT, the processor, and the transceiver. However, in other embodiments, one or more of these components may be omitted, or replaced by one or more different entities.

For example, in other embodiments the sensor system does not comprise a RAT. In such embodiments, the remaining components are powered in a different appropriate way, e.g. by being connected to the aircraft electrical power system.

In other embodiments, the sensor system does not comprise a processor. In such embodiments, the sensor measurements may be sent from the sensor system to a remote entity (e.g. a processor remote from the sensor system) without first being processed on the sensor system.

In other embodiments, the sensor system does not comprise a transceiver that provides a wireless link to an entity remote from the sensor system. In such embodiments, a different type of communications link may be provided, or the (processed or unprocessed) sensor measurements may be stored in the sensor system.

Also, in other embodiments, the store may house one or more different entities in addition to the RAT, the processor, and the transceiver.

In the above embodiments, the RAT wholly powers each of the sensors, the processor, and the transceiver. However, in other embodiments, the RAT does not, or only partially powers one or more of the sensors, the processor, and the transceiver.

In the above embodiments, the processor is a conventional High Power Near Real Time Processor. However, in other embodiments a different type of processor is used.

In the above embodiments, the transceiver is a conventional RF transceiver that provides a wireless, two-way communication link between the sensor system and a remote entity (i.e. an entity remote from the sensor system). However, in other embodiments, the transceiver is a different type of transceiver that provides any appropriate type of communication link.

The invention claimed is:

1. A method of providing apparatus for use on an aircraft, the method comprising:

provide a first store and a first payload, the first payload being mounted on or at least partially housed within the first store, the first store being for mounting to an external surface of the aircraft such that the combination of the first store and first payload is wholly outside the aircraft;

acquiring one or more aerodynamic properties, one or more moments of inertia, and the mass distribution of the combination of the first store and first payload;

providing a second store and a second payload, the second payload being mounted on or at least partially housed within the second store, the second store being for mounting to an external surface of the aircraft such that the combination of the second store and the second payload is wholly outside the aircraft, the second payload being different to the first payload, the second payload comprising a sensor and/or a projecting means, the sensor being for measuring parameters of one or more entities that are remote from the aircraft, the projecting means being for projecting a mark onto a surface; and configuring the second store and the second payload such that the one or more aerodynamic properties, one or more moments of inertia, and the mass distribution of the combination of the second store and the second payload are substantially the same as those of the combination of the first store and first payload, thereby providing the apparatus.

2. A method according to claim 1, wherein the one or more aerodynamic properties, one or more moments of inertia, and the mass distribution of the combination of the first store and first payload are for when the combination of the first store and first payload is mounted on the aircraft such that the combination of the first store and first payload is wholly outside the aircraft.

3. A method according to claim 1, wherein the second store is different to the first store.

4. A method according to claim 1, wherein the steps of providing the second store and the second payload and configuring the second store and the second payload are performed if the measurements of the one or more aerodynamic properties, one or more moments of inertia, and the mass distribution of the combination of the first store and first payload satisfy one or more predefined criteria.

5. A method according to claim 1, wherein the second payload further comprises a power source for at least partially powering the sensor and/or a projecting means.

6. A method according to claim 5, wherein the power source is a Ram Air Turbine.

7. A method according to claim 1, wherein the second payload further comprises a processor for processing a signal generated by the sensor and/or a projecting means.

8. A method according to claim 1, wherein:
the second payload further comprises a transmitter for transmitting, from the apparatus, across a wireless communications link, a signal; and
the signal is for use by an entity remote from the apparatus.

9. A method according to claim 1, wherein the sensor is one of the following type of sensors: a visual camera, a hyperspectral camera, an infrared camera, an ultra-violet camera, a LIDAR sensor, or a Ground Penetrating Radar sensor.

10. A method according to claim 1, wherein the projecting means is a laser marker for projecting a laser mark onto a surface.

11. A method according to claim 1, wherein:
each store is for mounting to an external surface of an aircraft via an interface;
the interface comprises a pylon; and
the pylon is such that the mounted store is clear of control surfaces of the aircraft.

12. A method according to claim 1, wherein each store is for mounting to an external surface of an aircraft such that the store may be jettisoned from the aircraft during flight.

13. A method according to claim 1, wherein the second payload further comprises ballast, a mass of the ballast and a distribution of the ballast with respect to the second store having been selected such that the one or more moments of inertia, and the mass distribution, of the combination of the second store and the second payload are substantially the same as those of the combination of the first store and first payload.

14. A method according to claim 1, the method further comprising mounting, to an external surface of the aircraft, the combination of the second store and second payload such that the combination of the second store and second payload is wholly outside the aircraft.

15. An apparatus for use on an aircraft comprising:
a first store and a first payload, the first payload being mounted on or at least partially housed within the first store, the first store being for mounting to an external surface of the aircraft such that the combination of the first store and first payload is wholly outside the aircraft;
wherein one or more aerodynamic properties, one or more moments of inertia, and the mass distribution of the combination of the first store and first payload are acquired;
a second store and a second payload, the second payload being mounted on or at least partially housed within the second store, the second store being for mounting to an external surface of the aircraft such that the combination of the second store and the second payload is wholly outside the aircraft, the second payload being different to the first payload, the second payload comprising a sensor and/or a projecting means, the sensor being for measuring parameters of one or more entities that are remote from the aircraft, the projecting means being for projecting a mark onto a surface; and
configuring the second store and the second payload such that the one or more aerodynamic properties, one or more moments of inertia, and the mass distribution of the combination of the second store and the second payload are substantially the same as those of the combination of the first store and first payload.

* * * * *